UNITED STATES PATENT OFFICE.

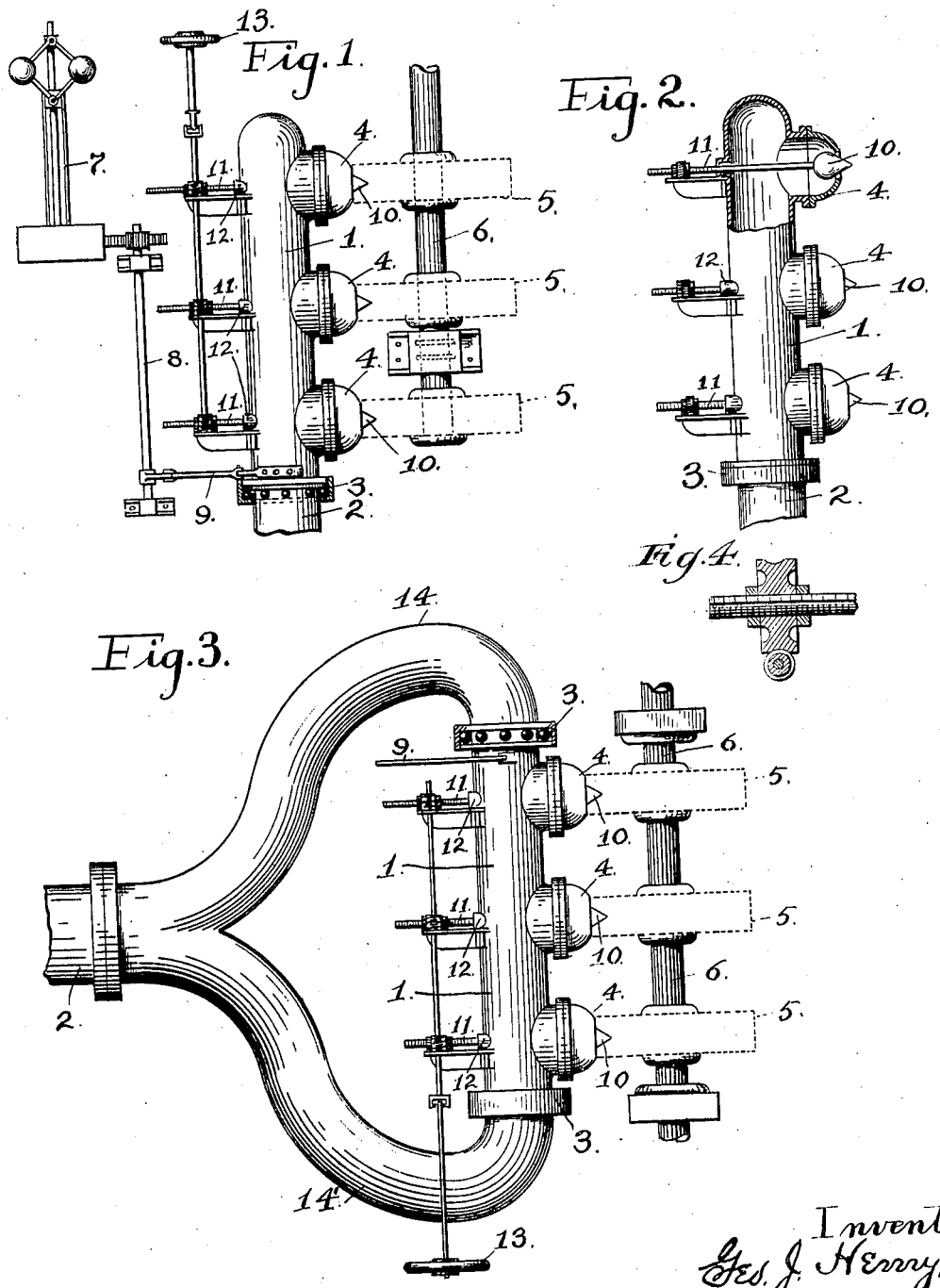

GEORGE J. HENRY, JR., OF SAN FRANCISCO, CALIFORNIA, ASSIGNOR OF ONE-HALF TO THE PELTON WATER WHEEL COMPANY, OF SAN FRANCISCO, CALIFORNIA, A CORPORATION OF CALIFORNIA.

REGULATING MEANS FOR IMPACT-STREAMS.

No. 870,292.　　　　　Specification of Letters Patent.　　　Patented Nov. 5, 1907.

Application filed August 29, 1905. Serial No. 276,254.

*To all whom it may concern:*

Be it known that I, GEORGE J. HENRY, Jr., a citizen of the United States, residing in the city and county of San Francisco, State of California, have invented certain new and useful Improvements in Regulating Means for Impact-Streams; and I do hereby declare the following to be a full, clear, and exact description of the same.

At the present time it is customary where it is desired to vary the quantity of an issuing stream and provide against waste of water, to employ in connection with the installation of a hydraulic plant for the operation of water wheels for power purposes, a deflectable nozzle to direct the issuing impact stream onto or off of the water wheel, together with means for regulating the outlet area of the deflectable nozzle to vary the quantity of the issuing impact stream in accordance with the deflection of the nozzle. The tendency in hydraulic practice is towards a constantly increasing size and capacity of water wheel units, thus requiring a corresponding increase as to the size and capacity of the deflecting nozzles used in connection therewith, resulting in a cumbersome and expensive device, necessitating the expenditure of greater power mechanism to handle and control the said nozzles during the working of the plant. At times it is required to supply a number of impact streams to operate a number of water wheels for the purpose of obtaining their added power for driving a single unit, and heretofore it has been customary to arrange a series of deflecting nozzles with such wheels, making ball joint and deflecting pipe for each impact stream of water.

The object of the present invention is to dispose of the deflecting nozzles heretofore used, by providing a controlling device for directing one or more impact streams onto the bucket of a water wheel or series of water wheels mounted on a power shaft, said device being rotatable about its axis.

To comprehend the invention reference should be had to the accompanying sheets of drawings, wherein:—

Figure 1 is a view disclosing a series of water wheels on a vertical shaft, the rotatable device for directing the impact streams onto the water wheels being in a vertical position parallel to the wheel shaft, the water supply pipe onto which the stream controlling device is rotatably mounted, being illustrated, said view also illustrating the ball bearing for the supporting end of the rotatable device, the needle valves for controlling the outlet area thereof for the impact streams, and the governor connection for actuating said rotatable device to place the impact streams issuing therefrom onto or off of the water wheel in accordance with variations in the working load thereof; Fig. 2 is a detail view of the rotatable device partly broken to illustrate the position of the valves for controlling the outlet openings thereof for varying the quantity of the impact stream issuing therefrom; and Fig. 3 is a detail view of the rotatable stream directing device arranged in a horizontal position, the water wheels being arranged in advance thereof on a horizontal shaft, the rotatable stream directing device being rotatably held between branch extensions of the main line water supply pipe so as to receive water in each end of the said directing device, and cause a balanced pressure against the rotatable water directing device.

In the drawings the numeral 1 is used to designate the rotatable stream directing device, which in Fig. 1 of the drawings is rotatably mounted on the end of a water supply pipe 2. The supporting end of the said directing device is held in roller bearings 3, resting upon a flange of any suitable construction on said supply pipe 2. The directing device thus constitutes a rotatable member of the water supply pipe, which member is provided with one or more outlet tips 4, through which the impact stream issues.

The member 1 is rotated to direct the impact streams issuing therefrom onto or off of the buckets of the water wheels 5, mounted on the shaft 6, by means of the governor 7, said governor being connected thereto by means of the connections 8—9.

The outlet area of each tip 4 is controlled in the present case by a hand actuated needle valve 10, the stem 11 of which extends through a stuffing gland 12 outside of the rotatable member and has operatively connected therewith a hand wheel 13, by means of a rotatable member 13', through the medium of which the said valve may be adjusted into and out of the tip 4 to vary its outlet area so as to regulate the quantity of the impact stream issuing therefrom in accordance to variations as to the working load of the wheels, thereby preventing the waste of water when the rotatable member has been actuated by the governor mechanism to place a less quantity of the impact stream or streams onto the water wheel or wheels.

Fig. 3 of the drawings illustrates the directing member 1 for the impact stream, as being rotatably held between branch extensions 14—14' of the main line pipe 2. In this case the water flowing through the main line pipe, enters the rotatable member from each end and evenly balances the said rotatable member. The governor mechanism, its connection with the rotatable member of the main line pipe, the outlet tip or tips for the discharge of the impact stream or streams onto the water wheel or wheels, likewise the means for controlling the outlet area of the discharge tip or tips, is the same as that disclosed by Fig. 1 of the drawings, and said parts are designated by the same reference numerals.

The reason for directing the impact stream onto and off of the water wheel and for regulating the quantity of the issuing impact stream accordingly, is too well understood in the art to require mentioning herein.

The described directing means for the impact stream permits of easier adjustment by the expenditure of less power, is capable of taking care of a greater quantity of water and the operation of larger hydraulic plants, than is possible by the deflecting nozzle, besides being of use in such places wherein the limited space afforded for the working thereof, precludes the possibility of a deflecting nozzle being employed.

Having thus described the invention, what is claimed as new and desired to be protected by Letters Patent is—

1. The combination with a hydraulic motor of a main line water pipe, a straight longitudinal nozzle supply pipe movable about its own longitudinal axis, to vary the direction of the stream relative to the motor.

2. The combination with a hydraulic motor of a main line water pipe, an elongated substantially straight nozzle pipe extending in a direction parallel with the axis of the motor and means for rotating the nozzle pipe about its own longitudinal axis.

3. The combination with a water wheel or hydraulic motor, of a main line water supply pipe, of a straight longitudinal member rotatably connected therewith and constituting a prolongation thereof for directing the impact stream onto the water wheel, an outlet opening in said rotatable member, of mechanism for rotating said member about its own longitudinal axis for directing an impact stream onto or off the water wheel, and means for controlling the discharge area of the outlet of the rotatable member to regulate the quantity of the water discharge therefrom.

4. The combination of a hydraulic motor of a main line water pipe, a nozzle pipe movable about its own longitudinal axis and about the stream passing therethrough, and means for moving the nozzle pipe relative to the periphery of the motor wheel while maintaining it fixed against movement across said periphery.

5. In combination with a water wheel, of a water supply pipe, means for automatically turning a portion of the water flowing from the pipe away from or towards the wheel, said means including a straight longitudinal member constituting a prolongation of said pipe and rotatable about its own longitudinal axis, a valve to regulate the flow of water, a speed governor, and interconnecting operating mechanism between the governor and the automatic turning means.

6. In combination with a water wheel, an elongated supply nozzle member rotatable about its own longitudinal axis, to dispose its outlet at different points around the periphery of the wheel whenever the wheel changes its speed, a valve to regulate the flow of water from the nozzle, and valve operating mechanism.

7. In combination with a hydraulic motor, of the governor mechanism, a water supply pipe, a longitudinal straight hollow nozzle carrying device actuated by the governor mechanism for varying the direction of the discharge stream from the nozzle, the said carrying device constituting a prolongation of said supply pipe in the same direction, and a nozzle connected directly to said device and extending at substantially right angles to the direction of the flow of the stream through said device, and means for varying the discharge from the nozzle.

8. The combination with a hydraulic motor, of a main line water pipe, of a plurality of nozzles and a single longitudinal straight carrying pipe for said nozzle rotatable about its own longitudinal axis and connected to said water pipe and constituting a continuation thereof in substantially the same line whereby the relative position of said nozzles with respect to said motor may be simultaneously adjusted in the same direction relative to the motor.

9. The combination with a hydraulic motor, of a main line water pipe, of a plurality of connected nozzles removable relative to the motor to change the direction of the issuing stream, means for varying the discharge outlet of the respective nozzles, and a common actuating means for said last mentioned means.

10. The combination with a hydraulic motor, of a main line water pipe, a plurality of connected nozzles simultaneously movable relative to the motor to change the direction of the issuing stream, automatically operable means for adjusting said nozzles, means for varying the discharge outlet of the respective nozzles, and a common actuating means for said last mentioned means.

11. The combination with a hydraulic motor, of a main line water pipe, a plurality of connected nozzles simultaneously movable relative to the motor to change the direction of the issuing stream, means mounted within the nozzles for varying the discharge outlet of the respective nozzles, and a common actuating means for said last mentioned means.

12. The combination with a series of hydraulic motors mounted on a single shaft, of a main line pipe, of a rotatable device having a series of nozzles extending at right angles thereto for directing the impact stream onto and off the water wheels, the said device being rotatably connected at one end to one terminal of the main line pipe, and arranged parallel to the wheel shaft.

13. The combination with a series of hydraulic motors mounted on a single shaft, of a main line supply pipe having branch extensions at its outlet end, of a rotatable device having a series of nozzles for directing the impact stream onto and off the water wheels, the said device being rotatably connected at its opposite ends to the respective terminals of the main line pipe.

14. The combination with a series of hydraulic motors mounted on a single shaft, of a main line supply pipe having branch extensions at its outlet end, of a rotatable device having a series of nozzles for directing an impact stream onto and off the water wheels, the said device being rotatably connected at its opposite ends to the respective terminals of the main line pipe, and means within the respective nozzles for varying the discharge therefrom.

15. The combination with a series of hydraulic motors mounted on a single shaft, of a main line supply pipe having branch extensions at its outlet end, of a rotatable device having a series of nozzles for directing an impact stream onto and off the water wheels, the said device being rotatably connected at its opposite ends to the respective terminals of the main line pipe, means within the respective nozzles for varying the discharge therefrom and a common actuating means for said last mentioned means.

16. The combination with a series of hydraulic motors, mounted on a single shaft, of a main line supply pipe having branch extensions at its outlet end, of an automatically rotatable device having a series of nozzles for directing the impact stream onto and off the water wheels, the said device being rotatably connected at its opposite ends to the respective terminals of the main line pipe.

17. The combination of a water wheel, a main line water pipe, a nozzle pipe comprising a longitudinal member carrying a series of nozzles and means for rotating the nozzle pipe about its own longitudinal axis whereby the nozzles are moving simultaneously in the same direction towards and from the wheel.

18. The combination with a hydraulic motor of a main line water pipe, a member rotatably connected therewith and comprising a longitudinal member rotatable about its own longitudinal axis for directing an impact stream wholly or partially onto and off the motor and mechanism for actuating said member in accordance with the working load of the motor.

In testimony whereof I have hereunto affixed my signature in the presence of witnesses.

GEORGE J. HENRY, Jr.

Witnesses:
N. A. ACKER,
D. B. RICHARDS.